Patented June 6, 1950

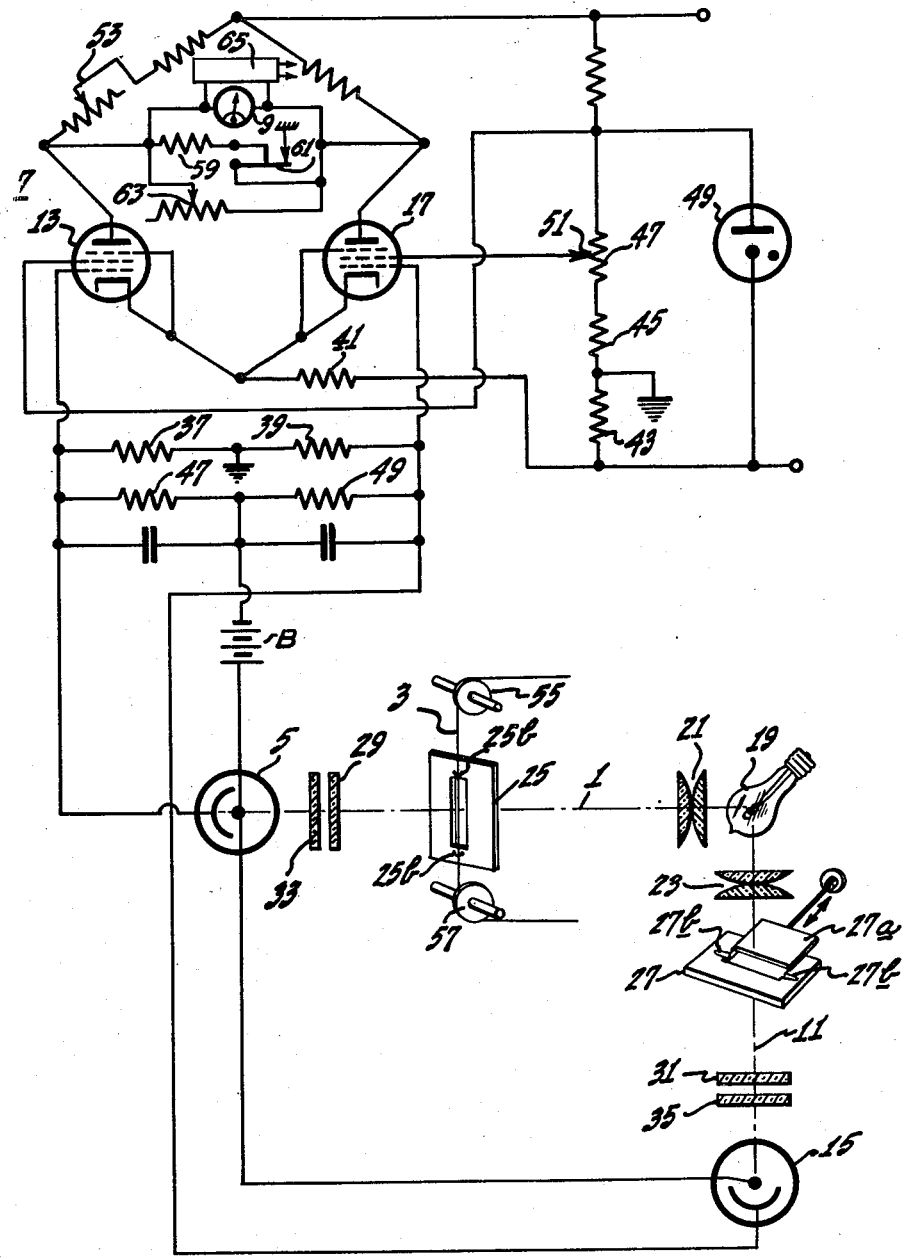

2,510,347

UNITED STATES PATENT OFFICE 2,510,347

PHOTOELECTRIC COMPARATOR HAVING TWO BRIDGE CIRCUITS

Theodore B. Perkins, West Orange, N. J., assignor to Radio Corporation of America, a corporation of Delaware Application October 19, 1945, Serial No. 623,365

2 Claims. (Cl. 88—14)

This invention relates to improvements in the art of photoelectrically comparing the size of an object with a standard, and has special reference to the detection of variations in the diameter of thread, wire and other filamentary or rod-like objects.

In one form of photoelectric diameter-checking machine described in "Electron Tubes in Industry," Henney, 1937 ed. pp. 396, 397, the work comes to rest on a V-block and an image of the filament of the exciter lamp is focused in the center line, or diameter, of the rod or other object under test. The projection system is then brought in focus with the diameter, which is brightly illuminated by the filament image, and a shadow of the work is projected to the lower part of the machine, where it is picked up by a cylindrical mirror. The cylindrical mirror projects the light back to a bank of four phototubes, and as the work increases or decreases the shadow moves to eclipse the various cells. A secondary relay circuit is usually provided for sorting and grading the work. Thus, if the object being measured is undersized, all four cells are illuminated, and four secondary relays are all energized, if the object is small, one cell is shadowed, three illuminated; if the object is standard three cells are shadowed, and one illuminated; and if the object is oversized, all the cells are shadowed.

In the device above described one-tenth of a thousandth of an inch change in diameter of the work causes a shadow movement of about ¾ in. and, obviously, if false readings are to be avoided, the V-shape work support, the cylindrical mirror and each photocell, must be insulated against shocks and tremors of even the most minute intensity. Such thorough insulation is not always possible of achievement, especially in factories or mills wherein the test equipment must be located in close proximity to the production machines.

Accordingly, the principal object of the present invention is to provide an improved method of and apparatus for photoelectrically detecting variations in the area or diameter of various objects, and one which shall be immune to shocks and tremors of any ordinary intensity.

Another and important object of the present invention is to provide a simple, inexpensive and trouble-free apparatus of the general character described, and one which is applicable to the testing of a rapidly moving thread, wire or the like.

Referring now to the drawing: The foregoing and other objects are achieved in accordance with the method of the invention by projecting a uniform area of light, designated 1 in the drawing, past the wire or other object 3 to be tested onto a phototube 5 in such a way that, even if vibrated, the object always cuts off the same amount of light, and by comparing the effective intensity of the remaining light, electrically, as by means of a bridge circuit 7 and meter 9, with a "comparator" beam 11 of "standard" intensity.

It will be observed that the phototube 5 for the test beam 1 is connected to its power supply B through a resistor 47 and that the phototube 15 which picks up the comparator beam 11 is connected to the said source through a resistor 49. (The source B of anode voltage for the phototube 5 and 15 may be a dry battery; since the current drain is low.) Current differentials through the phototubes 5 and 15 cause opposing voltage across the resistors 47 and 49. The difference, if any, between these two voltages is applied directly to resistors 37 and 39 in the grid input circuits of amplifier tubes 13 and 17. The bridge 7 thus receives only the said difference voltage, i. e. a voltage proportional to the difference in the intensity of the light impinging upon the phototubes 5 and 15. The meter 9, to which this differential voltage is applied, may be calibrated in any suitable manner to indicate any departure from standard in the diameter or size of the object. If the meter is a plural scale device a shunt resistor 59 and a switch 61 may be provided for shifting from one scale to the other. A variable (vernier) resistor 63 is preferably provided in shunt with the switch 61 and resistor 59 for adjusting the sensitivity of the meter 9.

Under normal conditions (i. e. when the object 3 is of "standard" dimensions) the beam 1 which impinges upon the object and the comparator beam 11 should be of the same intensity and, to this end, are derived from a common source of light 19 and pass through duplicate optical systems, exemplified by the condenser lenses 21 and 23, masks 25 and 27 color filters 29 and 31 and diffusion (ground glass) filters 33 and 35.

The light source 19 preferably comprises a projection lamp (such as a 10 volt, 5-ampere, General Electric Co. or Westinghouse Lamp Co. "T-8" bulb) wherein the filament is so oriented that it presents the same aspect to each branch and thus provides approximately the same light flux to each of the phototubes 5 and 15.

The condensing lenses 21 and 23 may each consist of two plano-convex lenses placed with the convex sides adjacent. These lenses 21 and 23 may each comprise two Bausch and Lomb No. 51-53-13-012. Their diameter is 40.5 mm. Their focal length is 109.5 mm., thus the focal length of each condenser (two lens elements) is approximately 55 mm. From this information, the physical length of each of the branches can be found from the law of conjugate focii:

$$f = \frac{uv}{u-v}$$

where $f$ is the focal length of the lens, and $u$ and $v$ are, in this case, the distance from the lens to the lamp filament, and to the ground glass plate 33 or 35. The distance from the lens to the ground glass may well be rather large in order to make the light beam as nearly parallel as practicable, this means that the lens will be near the lamp filament. As an example: if 80 mm. be a convenient filament-lens distance, then the lens-glass distance is found to be approximately 175 mm. Lenses of short focal length can be used if a more compact design is required.

The ground glass diffusion filters 33 and 35 on which the images of the filament are focused should be only slightly roughened. The purpose of these plates is to decrease vibration effects by diffusing the light over the whole phototube cathode without, however, wasting light outside that area. Consequently, a lightly frosted glass is preferable to the usual ground glass.

The color filters 29 and 31 serve to eliminate the shorter wavelengths of the light which give rise to instability in photosensitivity. They may comprise Wratten filters No. 27A, which can be obtained from Eastman Kodak Co. in the form of gelatin sheets approximately three inches square. The color filter, the ground glass, diffusion filter and a protective clear glass plate (not shown) may be bound together with the glass toward the filter so that the difficulties of cleaning the frosted surface can be avoided. Such a "sandwich" should be bound by means of "lantern-slide tape" rather than with transparent cement, lacquer or Canada balsam since the use of the latter materials between the filter and the ground surface will nullify the effect of the ground surface.

The optical systems for the beams 1 and 3 are preferably contained in separate housings (not shown), in which case the mask 25 for the beam 1 may comprise a partition in the housing. The mask 25 has a rectangular (rather than circular) opening therein and is thus shaped that even though the object 3 be vibrated or moved across the aperture it will always intercept the same quantity of light. This rectangular opening is preferably oriented with its long dimension aligned with the long dimension of the cathode of the phototube 5. The size of the aperture is determined by the degree of sensitivity desired, i. e. the smaller the opening the greater the sensitivity, since a small variation in the diameter of the object under test will block off a greater percentage of the light reaching the phototube. An opening of about one-quarter inch by one and one-eighth inches has been found satisfactory for the measurements of a 60 mil wire or thread.

The other mask 27 is preferably provided with an adjustable shutter or iris 27a so that the effective intensity of the light which passes therethrough may be adjusted to a value corresponding to the value which would obtain if an object of the desired standard dimensions were interposed in the path of said beam. Alternatively, the shutter may be omitted and, if the apertures in the masks 25 and 27 are of the same dimensions, a standard object may itself be placed across the aperture in the mask 27, as indicated by the provision of a grooved support 27b thereon. The same adjustment in the intensity of the light can also be achieved by the use of a suitable filter, not shown.

As previously set forth the outputs of the two phototubes 5 and 15 are connected through grid input resistors 37 and 39 to the bridge amplifier tubes 13 and 17, respectively. Thus, variations in the difference of potential between the amplifier tube grids are minimized for variations in lamp current due to line voltage variations. These tubes 13 and 17, are biased in a manner calculated to operate them on the sensitive linear portion of their characteristic curves. The bias is provided by two cathode resistors 41 and 43, one of which, 43, is included in a voltage regulated bleeder circuit, consisting of two series resistors 45 and 47 and a voltage regulator tube 49 (say an RCA type OC3/VR-105). This arrangement provides a fixed positive bias which allows the use of a high value of cathode resistance 41 to create high D.-C. degeneration and provide a high degree of D.-C. stabilization. The phototube bridge circuit comprising the two phototubes 5 and 15 and the resistors 47 and 49 allows only the difference in potential created by the flow of phototube currents through resistors 47 and 49 to be impressed on the grids of the amplifier tubes 13 and 17, thereby preventing the variation of phototube currents (caused by changes in the intensity of the light at the source 19) from causing a variation of bias on the amplifier tubes 13 and 17. The screen grid potential of one tube, in this case tube 17, is made adjustable, as indicated at 51, to compensate for tube variations and to make electrical balance possible. Fine control of the balance is made by means of a control 53 in one of the arms of the bridge.

In operating the apparatus of the invention the preferred practice is to start with the apertured plates 25 and 27 completely masked and then to balance the bridge by manipulating the controls 51 and 53 in a manner dictated by the meter 9. When the bridge is balanced both masks are opened and an object of standard dimensions is placed in the aperture of the mask 25. This, of course, unbalances the bridge but the balance is then restored by partially closing the iris 27a on the mask 27, or by otherwise reducing the relative intensity of the comparator beam 11. With the balance thus restored the standard object is removed from its support 25b on the plate 25 and the object to be tested is substituted therefor. When, as in the instant case, the object to be tested comprises an elongated filament such as a thread of wire 3 it may be supported for rapid continuous movement adjacent to the aperture in the mask 25 as upon guide rollers 55 and 57. If desired, the movement of the wire 3, may be controlled by a relay 65 in shunt with the meter 9 in the bridge circuit 1.

It will now be apparent that the present invention provides an improved photoelectric comparator and one which is substantially immune to shocks and tremors of any ordinary intensity.

What is claimed is:

1. In apparatus for obtaining an indication of any departure from a standard in the size of an object, means for generating a plurality of discrete stationary beams of light of substantially equal intensity, a pair of phototubes each mounted in the path of a separate one of said beams, each of said phototubes having a photo-cathode upon which one of said beams impinges and an anode, means for adjusting the effective intensity of one of said beams to a value corresponding to the value which would obtain if an object of said standard size were interposed in the path of said beam, means for moving an object to be tested transversely through the other of said beams intermediate the source of said light and the phototube in the path thereof thereby to scan said object longitudinally and to modify the intensity of said other light beam in accordance with variations in the size of said object from said standard, a first normally balanced bridge circuit including a pair of electronic grid controlled tubes each in a separate branch thereof, said electronic tubes each having a control grid and each having an anode and a cathode connected to opposite potential supply junctions of said bridge, a resistor connected between the grid and the cathode of each said electronic tube, a second normally balanced bridge circuit including in each branch a separate one of said phototubes, the anodes of the phototubes being connected in series with each other through a pair of resistors, said second bridge circuit being connected between said electronic tube grids, the anode of each phototube being connected to a different control grid and being connected to said cathodes only through said resistors so as to supply potentials of opposite effect simultaneously to both of said grids upon the occurrence of any unbalance in said second bridge circuit due to a change in the illumination of one of said phototubes, and an indicating device connected between said anodes in said first bridge circuit to indicate variations of said object from said standard size.

2. In an apparatus for obtaining an indication of any departure from a standard in the diameter of a filament, means for generating a plurality of discrete stationary beams of light of substantially equal intensity, a pair of phototubes each mounted in the path of a separate one of said beams, each of said tubes having a photo-cathode upon which one of said beams impinges and an anode, means for adjusting the effective intensity of one of said beams to a value corresponding to the value which would obtain if an object of said standard diameter were interposed in the path of said beam, a reeling system for moving said filament transversely through the other of said beams intermediate the source of said light and the phototube in the path thereof whereby to interrupt a portion of the light of which said beam is comprised, means for diffusing the light which passes said object over an extended area of the photocathode of said tube, a first normally balanced bridge circuit including a pair of electronic grid-controlled tubes each in a separate branch of said bridge, said electronic tubes each having a control grid and each having an anode and a cathode connected to opposite potential supply junctions of said bridge, a resistor connected between the grid and the cathode of each said electronic tube, a second normally balanced bridge circuit including in each branch a separate one of said phototubes, the anodes of the phototubes being connected in series with each other through a pair of resistors, said second bridge circuit being connected between said electronic tube grids, the anode of each phototube being connected to a different control grid and being connected to said cathodes only through said resistors so as to supply potentials of opposite effect simultaneously to both of said grids upon the occurrence of any unbalance in said second bridge circuit due to a change in the illumination of one of said phototubes, and an indicating device connected between said anodes in said first bridge circuit to indicate variations of said diameter from said standard.

THEODORE B. PERKINS.

REFERENCES CITED

The following references are of record in the file of this patent:

UNITED STATES PATENTS

| Number | Name | Date |
|---|---|---|
| 1,963,185 | Wilson | June 13, 1934 |
| 1,971,317 | Sheldon | Aug. 21, 1934 |
| 1,999,023 | Sharp et al. | Aug. 23, 1935 |
| 2,123,573 | McFarlan et al. | July 12, 1938 |
| 2,139,474 | Shepard | Dec. 6, 1938 |
| 2,213,534 | Rowe | Sept. 3, 1940 |
| 2,237,950 | Pineo | Apr. 8, 1941 |
| 2,286,985 | Hanson | June 16, 1942 |
| 2,415,174 | Hurley | Feb. 4, 1947 |
| 2,415,177 | Hurley | Feb. 4, 1947 |

OTHER REFERENCES

"Die Kunstseide" for August 1931, page 283.